No. 11,922. Reissued July 23, 1901
P. G. BURGESS & H. W. WILDER.
TELEPHONE CIRCUITS.
(Application filed Apr. 19, 1901.)
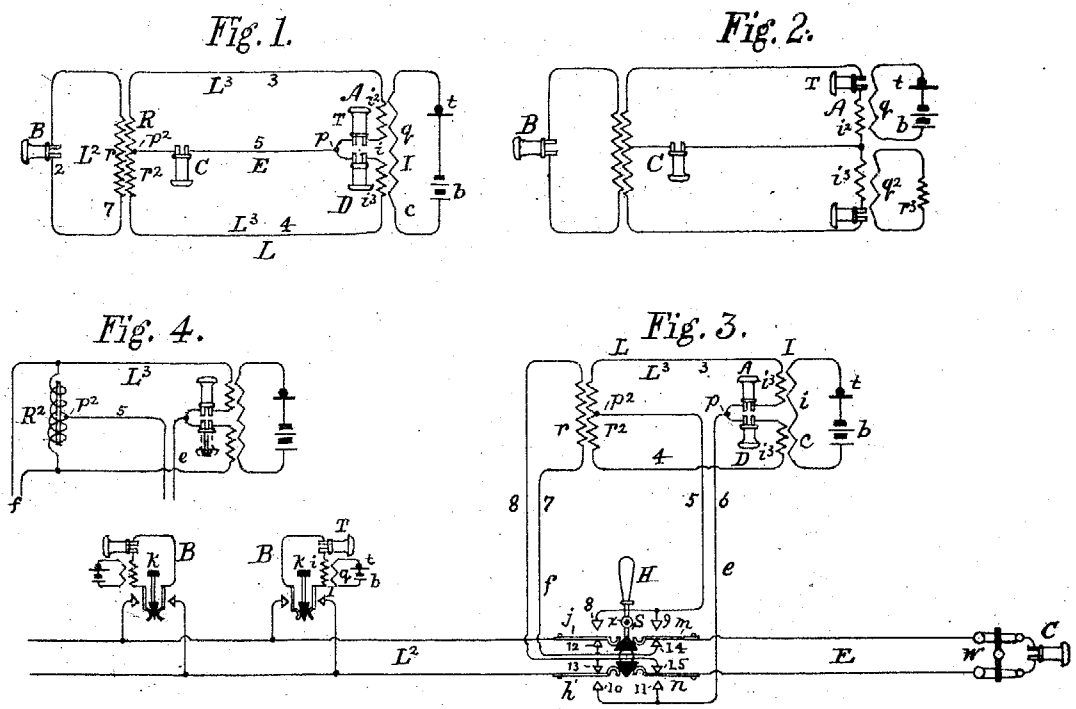
WITNESSES:
H. B. Herkam
INVENTORS,
Percival G. Burgess
and Henry W. Wilder
BY Philip Mason
ATTORNEY.

UNITED STATES PATENT OFFICE.

PERCIVAL G. BURGESS, OF MEXICO, MEXICO, AND HENRY W. WILDER, OF ALBANY, NEW YORK, ASSIGNORS TO THE AMERICAN BELL TELEPHONE COMPANY, OF BOSTON, MASSACHUSETTS.

TELEPHONE-CIRCUITS.

SPECIFICATION forming part of Reissued Letters Patent No. 11,922, dated July 23, 1901.

Original No. 626,826, dated June 13, 1899. Application for reissue filed April 19, 1901. Serial No. 56,663.

*To all whom it may concern:*

Be it known that we, PERCIVAL G. BURGESS, of the city of Mexico, Mexico, and HENRY W. WILDER, of Albany, New York, have invented certain new and useful Improvements in Telephone-Circuits, of which the following is a specification.

In telephone-exchange practice conditions frequently occur under which it becomes desirable that of two persons engaged in conversation by telephone one shall be able to listen to and receive messages from a third telephone, which messages or like transmitted conversation, however, shall remain unheard by the other. Such a case is found when an operator in a telephone-exchange central station is required to attend to calls and make and supervise switch connections between substation-lines and also to receive communications over an "order-wire" or "instruction-circuit" from other operators. Sometimes also it is desirable that the said operator shall be provided with means to so transpose the connections of her telephones that conversation can be by them transmitted as well as received over the latter circuit and received only over the service-lines. At other times it may be desirable for the three kinds of circuit—to wit, the circuit of the operator's telephone, the order-circuit, and the service-circuit of any kind—to be so interconnected that each one may talk with and hear either or both of the others and again for the said three circuits to be so relatively arranged that a given one may hear and talk to the other two, which, however, cannot hear or talk with each other.

Attempts have heretofore been made to carry out the foregoing ideas more or less perfectly, the most practical prior expedient being the employment of such an operator's receiving-telephone as that described in Letters Patent of the United States No. 487,219, granted to Hammond V. Hayes and Wilton L. Richards November 29, 1892, the same having two inducing-magnets, each with its own coil and diaphragm, the poles and helices of each magnet being arranged in a position inductively neutral to that of the other; but such a compound telephone is so heavy and cumbrous that it cannot be worn by an operator upon her head (except for a very short time) without inconvenience, and its efficiency is not very high. By means of our invention the ordinary standard single-circuit telephone can be used by the operator, and it reproduces the speech transmitted over the two independent circuits concerned—for example, a "service-circuit" and an "order-circuit"—substantially as well as it could were it associated with either circuit alone.

The invention comprehends a compound-circuit arrangement wherein three telephones are so relatively placed and connected by appropriate circuit-conductors that while the receiving instrument of one of them, which we may call A, shall be responsive to the transmission of both of the others, B and C, and shall be able to reproduce the messages transmitted by means of the said others the receiver of B will not respond to, receive, or reproduce the transmission of C, and the receiver of C will in like manner be neutral or irresponsive to B. This general arrangement can be carried into effect by connecting two of the said telephones either through the intermediation of repeating induction-coils or directly in one circuit, so that each can transmit to and receive from the other, and by forming a new circuit containing the third telephone or telephone apparatus and one of the others in part from certain portions of the conductors of the first circuit and in part of an auxiliary conductor which extends between and joins to opposite, but equipotential, points in the said first circuit. One way of constructing such an arrangement, which we have put into use and found practically efficient, is to have the first-mentioned circuit in two sections conductively separated but inductively united by a repeating induction-coil of ordinary construction, the two windings of the said coil and two of the telephones A and B being connected in the two circuit-sections, respectively. In one of the circuit-sections the mode of connecting its telephone B is immaterial and it is placed in series with the repeating-coil helix; but in the other circuit-section the secondary winding of the transmitter induction-coil is split or severed centrally into two equal portions, and the telephone-receiver A, in series with an impedance coil or device of equal electromagnetic value, (an exactly similar telephone-receiver may, in fact, be employed,) is connected between the two portions of the said split winding. A point between the said receiver and the impedance and another point at the middle of the repeating-coil winding are then equipotential points of the same circuit-section, and the auxiliary conductor, including the third telephone C, is extended between and unites them. When this construction is adopted, B can talk to A, but not to C, C can talk to A, but not to B, and A can listen both to B and C, but can only talk to B. The invention also comprehends the association with such a system of circuits of a circuit-changing switch which in one position maintain the relations already described between the three telephones concerned and which when placed in a second position reverses or transposes the said relation in such wise that B assumes in respect to A the former relation of C, and C the former relation of B, so that A can, as before, hear both, but can now talk to C instead of to B. Thus the transmission of A is alternative to B and C. The circuit-changer, however, can be and preferably is so devised and constructed as to be capable of assuming a third position, in which A can talk with and hear both B and C, and B and C can talk with and hear each other. Moreover, a number of modifications can be made in the compound-circuit organization without departing from the principles of our invention. For instance, the results which, as hereinbefore detailed, can be realized by means of the circuit-changing switch may also be attained (albeit not alternatively or selectively) by a slightly-changed permanent arrangement of the circuit-conductors.

In the drawings which accompany this specification, Figure 1 is a diagram of a compound-circuit organization exemplifying the principles of the invention. Fig. 2 is a diagram of a modified-circuit organization based on the same principles. Fig. 3 is a diagram illustrating a practical application of the said principles, combined with means for transposing the relations of the several telephones concerned; and Fig. 4 is a diagram showing a modification in a detail of the construction shown in Fig. 3.

Referring in the first place to Fig. 1, A, B, and C represent three differently-placed sets of telephone apparatus. R is a repeating induction-coil, and I a transmitter induction-coil. The set A of telephone apparatus is illustrated in detail and shows the arrangement of the transmitter $t$, battery $b$, and the primary winding $q$ of the induction-coil I, all in a local circuit $c$, the secondary winding $i$ of the said induction-coil centrally divided or severed into two equal portions $i^2$ and $i^3$, the receiving-telephone T, and an impedance device D. The latter appliances are joined up in series in the section $L^3$ of a conductively-divided circuit L, the receiver T and impedance D being placed between the two halves of the split secondary. The impedance device may be made of a coil of wire and a suitable iron core therefor having proportions and an electromagnetic value equal to that of the receiving instrument T. In fact, a second receiver may be conveniently employed for this purpose. The other section $L^2$ of the conductively-divided circuit L contains the telephone apparatus B, and the two sections contain, respectively, the two windings $r$ and $r^2$ of the repeating-coil R. The telephone apparatus C is connected up in an auxiliary conductor 5, which joins two electrically opposite points having the same potential of the circuit-section $L^3$, such points being point $p$ between the receiver T and impedance device D and point $p^2$ at the center of the repeating-coil winding $r^2$. We thus have an organization of two distinct circuits L and E. The circuit L is in two conductively-divided but inductively-united sections $L^2$ and $L^3$. The former contains in series the telephone or telephone apparatus B and winding $r$ of repeating-coil R, uniting them by conductors 2 and 7. The latter section $L^3$ contains the other winding $r^2$ of the said repeating-coil, the portion $i^2$ of the split induction-coil secondary $i$, the receiver T, the impedance-coil D, and the remaining portion $i^3$ of said secondary, these being united in series by conductors 3 and 4. The circuit E, beginning, say, at point $p$ between receiver T and impedance D, extends by conductor 5 through the telephone C to point $p^2$ and then by conductors 3 and 4 in parallel (one including the receiver T of telephone A and the other impedance D, and each containing one-half of the repeating-coil winding $r^2$ and the secondary winding $i$) back to the starting-point $p$. It is to be stated, however, that the working portion of the circuit is through the conductor 3, including the receiver T alone, that portion which leads through conductor 4 and the impedance D being employed for balancing and neutralizing purposes only. The telephones at B and C may comprise, of course, both receiving and transmitting instruments, and their induction-coil secondaries, which need not be divided, as shown, with telephone A, may be placed in series with the corresponding receiver, as indicated at B, Fig. 3. The representation of such telephones at B and C is therefore to be regarded as conventional or symbolic simply and not as intended to indicate the presence of a receiver only. The terms "telephone" and "telephonic apparatus" as used herein refer to the telephone instruments of a station considered as a complete apparatus, and where a receiver only is sought to be implied the term "receiver" is the one used. It is manifest from a consideration of the figure that voice-currents originating in telephone B circulate in section $L^2$ and by means of the repeating-coil R set up corresponding voice-currents of identical character in the circuit-section $L^3$. These flow through the circuit by way of conductors 3 and 4 and operate the receiver T of telephone apparatus A, reproducing the words transmitted by B, and if the transmitter $t$ of telephone A be operated the currents developed thereby in the local circuit $c$ propagate themselves in section $L^3$ by means of the induction-coil I and extend their influence to section $L^2$ by means of the repeating-coil R, thus reproducing the transmitted words in the receiver at B; but as the telephone C is connected between equipotential points of the circuit L neither A nor B can affect it, and for the same reason the operation of C cannot affect B, which can be influenced from circuit-section $L^3$ only by currents circulating through the repeating-coil winding $r^2$ from one terminal thereof to the other. A voice-current originating in virtue of words transmitted at C divides at points $p$ and $p^2$, half of it passing between said points through receiver T at A and operating the same in response to such transmission through the half $i^2$ of the split coil-winding $i$ and one half of winding $r^2$ of the repeating-coil, and the other half passing by way of point $p$, impedance D, and the remaining halves of coil-windings $i$ and $r^2$ to point $p^2$, and thence over conductor 5 to the originating telephone C. The effect of this current, so far as telephone B is concerned, is neutralized by its opposing actions in the repeating-coil, and the receiver at B is therefore irresponsive; but no such neutralizing influence being exercised as regards A, the receiver T of A is perfectly responsive to that portion of the talking-current which passes through it and conversation transmitted at C is received at A.

In Fig. 3 the circuit-section $L^2$ is the order-circuit leading to an operator's telephone from any desired number of other sets of telephone apparatus B, which may be either in the same or different stations. The telephones B are shown as being normally disconnected from the circuit, but adapted to be readily brought into connection with it by keys $k$. They are also shown as comprising the usual receiver and transmitter, with the induction-coil, battery, and local circuit of the latter. The telephones A and C are arranged as hereinbefore described, the former being the apparatus of an operator who is required to receive calls from an order-circuit and also supervise connections and send and receive calls on other circuits, such as substation-lines. Circuit E may represent a substation-line or may be a circuit running to the operator's keyboard or to keys which can connect with any circuit desired. The said keys are represented by the switch W. As shown in this figure, a circuit-changing switch S, operated by a lever H, fulcrumed at $x$, is placed at the junction-point of the circuits of the three telephones A, B, and C, the two latter entering the said junction by a single pair of loop-conductors having terminal-switch springs $j$ $h$ and $m$ $n$, respectively. Neither circuit is continuous to the repeating-coil winding $r$ or to the equipotential points $p$ $p^2$; but each can be alternatively brought into connection with either by means of two other pairs of loop-conductors entering diversely from telephone A, one of which loops $e$ has its conductors 5 and 6 extending from the said points $p$ $p^2$, while the conductors 7 8 of the other loop $f$ extend from the two ends of winding $r$ of the repeating-coil R. Conductor 5 of loop $e$ terminates at the circuit-changer S in the fixed outer contacts 8 9 of the springs $j$ $m$, and conductor 6 of the same loop terminates in fixed outer contacts 10 and 11. In the same way the conductors 7 8 of the other loop $f$ terminate in the inner fixed contacts 12 14 and 13 15, respectively.

When the circuit-changer has its handle turned to the left, the springs $j$ $h$ of circuit $L^2$ remain in connection with contacts 12 13, while the springs of circuit E are thrown outward and into contact with the points 9 and 11. Under these conditions the organization is exactly that indicated by Fig. 1, wherein A can listen to both B and C and can talk to B, while B and C can neither talk to nor hear each other. If the handle of the circuit-changer be turned to the right, we again have the same organization, except that B and C have changed places, B being now connected with the loop $e$ and C with loop $f$. The result is that A can listen to both B and C, as before, but can now speak only to C, B and C being still reciprocally irresponsive, and should the handle of the circuit-changer be placed in a vertical position the spring-terminals of both circuits $L^2$ and E remain as shown in the figure, one pair in contact with points 12 13 and the other with points 14 15. In such position the organization is a circuit of three branches in derivation, and the operator at A can talk with and hear both B and C and B and C can talk with and hear one another.

It is not of course essential to our invention and its operation that the repeating-coil R shall be interposed between the main section $L^3$ of the circuit and the other section $L^2$ thereof. If it be desired to operate the said two sections as a continuously-conductive circuit, the said repeating-coil may be dispensed with and an impedance-coil or electromagnetic resistance $R^2$ be substituted therefor in the manner illustrated by Fig, 4. In such a construction the conductor 5 of loop $e$ will connect with the middle point $p^2$ of the impedance-coil winding.

Fig. 2 illustrates a modified-circuit organization whereby A is enabled to speak to B and C at all times, as well as to hear them. The transmitter $t$ in this case has the primary winding $q$ of its induction-coil placed in inductive relation to the portion $i^2$ only of the secondary, this being balanced by a second primary joined up in short-circuit with a suitable balancing resistance $r^3$ and placed in inductive relation with the portion $i^3$ of the said secondary.

Our invention having now been fully described, we claim—

1. In a telephone system, the combination of three differently-placed telephones; a circuit including two of the said telephones in such manner that each may transmit to and receive from the other; and a second circuit formed in part of a portion of the first including one of the said telephones, and in part of an auxiliary conductor joining two equipotential points of the first circuit, and including the third or remaining telephone, the said third telephone being thereby adapted to transmit to one of the said two telephones of the first circuit but not to the other.

2. The combination in a telephone system, of a telephone-circuit in two conductively-divided sections; a repeating-coil inductively uniting the said sections, and its windings connected one in each; a telephone in one of the said sections in series with the repeating-coil winding thereof; and the split secondary winding of a transmitter induction-coil, a telephone-receiver, and an impedance device of equal electromagnetic value in the other of said sections in series with the repeating-coil winding thereof, the said receiver and impedance being placed between the two halves of the said split secondary; of an auxiliary conductor extended from a point between the said receiver and impedance to a central point of the repeating-coil winding of the same circuit-section; and a telephone connected in the circuit of said auxiliary conductor; substantially as and for the purposes set forth.

3. In a telephone system, the combination of two independent telephone-circuits, and telephones included therein, the said circuits extending from their respective telephones to a common station; an operator's telephone apparatus at the said station, comprising a transmitter, an induction-coil therefor with a split secondary winding, a telephone-receiver, and an impedance device of equal electromagnetic value, the said receiver and impedance being placed in series between the two halves of said secondary in a local circuit closed through one winding of a repeating-coil serving as an auxiliary impedance device; a terminal loop for the said local circuit including and extending from the other winding of said repeating-coil; and a second terminal loop therefor, the conductors thereof extending respectively from a point between the receiver and its associated impedance device, and from the middle point of the said auxiliary impedance device; and a circuit-changing switch at the junction of the said two independent telephone-circuits, and the said two terminal loops of the operator's telephone-circuit, controlling the respective terminal contacts of the said circuits and loops, and adapted in one position to maintain connection between one of the two circuits and the repeating-coil loop, and between the other circuit and the second terminal loop, and in another position to reverse the order of said connection; substantially as set forth.

4. In a telephone system, the combination of two outlying telephones, and independent circuits extending therefrom to the same station; a supervisory telephone apparatus including a transmitter and receiver at the said station; circuit connections uniting the said transmitter and receiver to one of the said independent telephone-circuits, and the receiver only to the other; and a circuit-changing device controlling the said connections of the supervisory instruments with the said circuits respectively, and to reverse or transpose them; substantially as set forth.

5. In a telephone system, the combination substantially as hereinbefore described, of three distinct telephone-circuits, converging from associated telephone instruments to a common junction-point, two of the said circuits entering the said junction each by a single pair of loop-conductors, and the third entering by two pairs of loop-conductors, one of which includes the transmitting and receiving telephones of the circuit, and the other the receiver only; and a circuit-changing switch at the said junction-point controlling all of the said loop-conductors, and adapted to alternatively connect the two pairs of loop-conductors of the third circuit with the loop-conductors of the two other circuits respectively, to reverse or transpose such order of connection, and to connect the loop which contains both transmitter and receiver of the said third circuit with the loops of both of the said other circuits, as desired.

In testimony whereof I have signed my name to this specification, in the presence of two subscribing witnesses, this 11th day of February, 1901.

PERCIVAL G. BURGESS.

Witnesses:
R. CABANAS, Jr.,
ALFRED CHAPA.

In testimony whereof I have signed my name to this specification, in the presence of two subscribing witnesses, this 2d day of March, 1901.

HENRY W. WILDER.

Witnesses:
C. M. WALRATH,
J. J. FITZSIMMONS.